Figure 1:
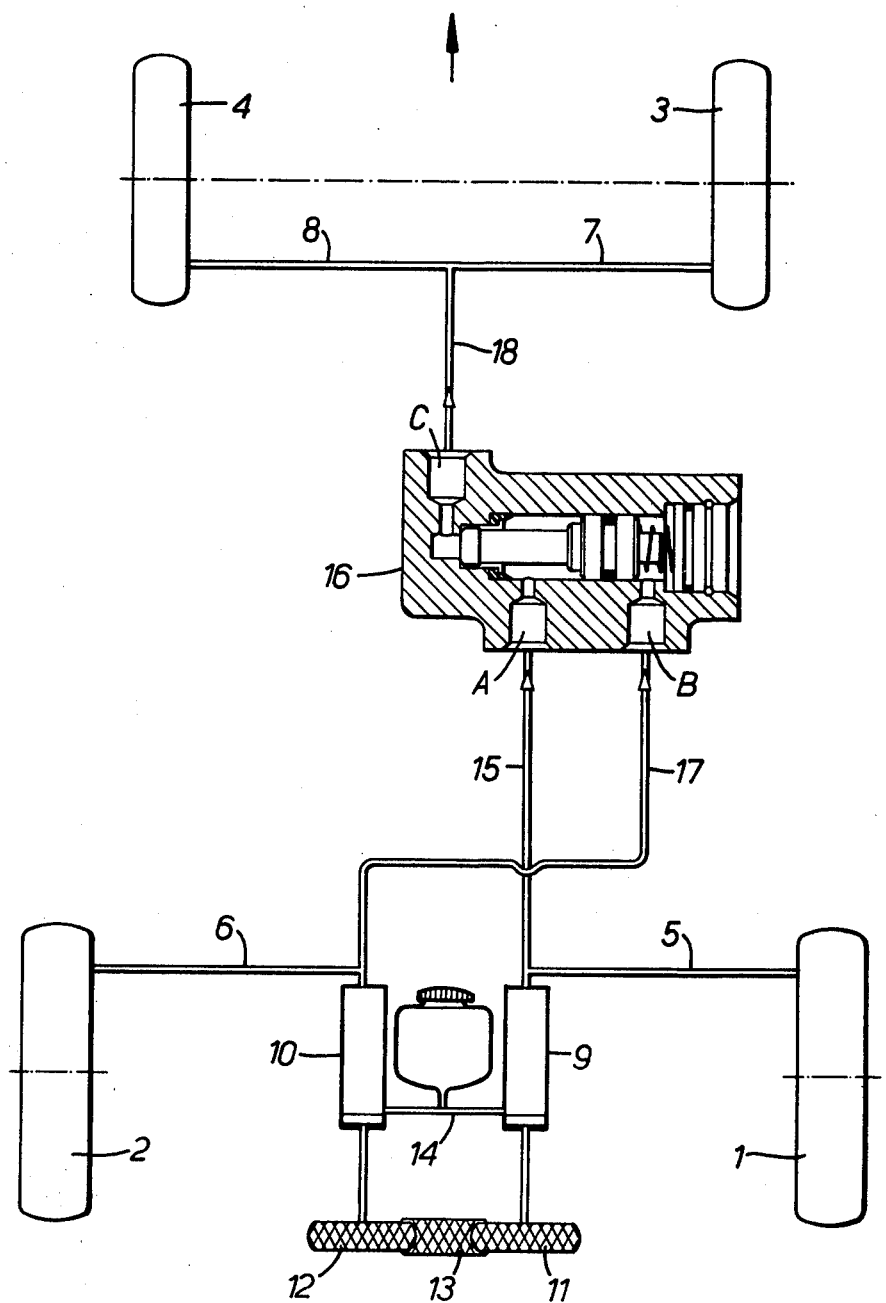

United States Patent [19]

Pickenhahn

[11] Patent Number: 4,457,562
[45] Date of Patent: Jul. 3, 1984

[54] BRAKE ISOLATOR VALVE

[75] Inventor: Josef Pickenhahn, Plaidt, Fed. Rep. of Germany

[73] Assignee: Lucas Industries Limited, Birmingham, England

[21] Appl. No.: 364,024

[22] Filed: Mar. 31, 1982

[30] Foreign Application Priority Data

Apr. 7, 1981 [GB] United Kingdom ............... 8110833

[51] Int. Cl.³ ............................................ B60T 11/20
[52] U.S. Cl. ..................................... 303/6 A; 180/6.2
[58] Field of Search ..................... 188/16, 345, 349; 180/6.2; 303/6 R, 6 A, 9, 13, 14

[56] References Cited

U.S. PATENT DOCUMENTS 3,386,775 6/1968 Jones .................................. 188/16 X
3,863,991 2/1975 Wilson ............................ 303/6 A X Primary Examiner—Duane A. Reger
Attorney, Agent, or Firm—Scrivener, Clarke, Scrivener and Johnson

[57] ABSTRACT

A brake circuit for a vehicle having selectively brakeable rear wheels comprises separate master cylinders each connected to one rear wheel brake and separately operable by means of foot pedals. The outputs of the master cylinders are connected to a control valve which in turn is connected to front wheel hydraulic brakes of the vehicle. When either of the pedals is depressed without depressing the other pedal the control valve is effective to isolate the front brakes from the pressurized rear brake circuit. However, when the brake pedals are linked together by a plate so that both rear brakes are operated together with control valve establishes a communication between the output of one master cylinder and the front brakes, thereby allowing four wheel braking.

5 Claims, 2 Drawing Figures

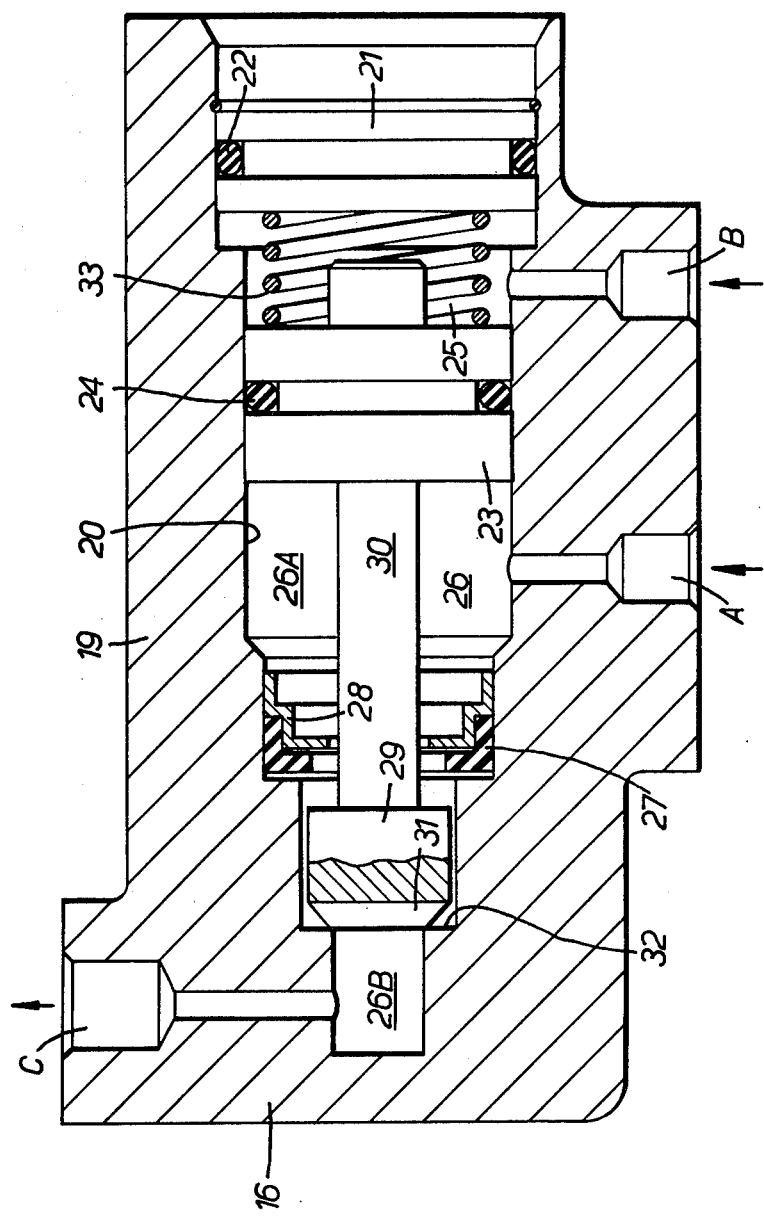

BRAKE ISOLATOR VALVE

This invention relates to the art of braking, and more particularly to a hydraulic brake system for a motor vehicle.

It is well known to provide certain vehicles, noteably agricultural tractors and certain civil engineering vehicles with separately operable rear hydraulic brakes in order to permit steering of the vehicle to be effected or assisted by means of braking one or other rear wheel of the vehicle. In such systems, it is usual to provide two separate brake pedals each operating a respective master cylinder, each master cylinder operating one of the rear brakes. A mechanical coupling is provided which may be used to lock the two brake pedals together when it is desired to operate both rear brakes together, for example during road travel.

In a desire to improve the brakes of such vehicles, particularly for use in travelling on the public highway, it has been proposed to provide such vehicles with front hydraulic brakes in addition to the known rear hydraulic brakes. If front hydraulic brakes are provided, it is desirable to provide an automatic mechanism which renders inoperative the front brakes when the rear brakes are used separately for stearing the vehicle. One such mechanism is described in German patent specification DE No. 2059037 which describes a control valve comprising first and second chambers connected to the output of one master cylinder, and a third chamber, located between the first and second chambers, connected to the output of the other master cylinder. This control valve requires the use of two connections to the first master cylinder, one connecting the first chamber to the first master cylinder and the other connecting the second chamber to the first master cylinder, and the use of two dynamic seals, one between the first and third chambers, and one between the second and third chambers. The use of two dynamic seals increases the force required to move the control piston, and increases the probability of seal failure.

According to the present invention there is provided a hydraulic brake system for a vehicle which includes a pair of front ground-engaging members and a pair of rear ground-engaging members and which is steerable by selectively braking one of the rear ground-engaging members, the system comprising: a separate hydraulic rear brake mechanism for each rear ground-engaging member; first and second hydraulic master cylinders each connected to a respective one of said hydraulic brake mechanisms, each master cylinder being separately operable to brake its associated rear ground-engaging member; a separate hydraulic front brake mechanism for each front ground-engaging member; and a control valve connected to both hydraulic master cylinder outputs and to both front brake mechanisms, the control valve including: a closed chamber connected to the output of the second master cylinder; a flow chamber connected to the output of the first master cylinder and to the front brake mechanisms; a control piston separating said chambers; a normally open valve set located in said flow chamber and closable to isolate the output of the first master cylinder from the front brake mechanisms; and means coupling said valve set to said control piston whereby movement of said control piston in response to the pressure in said flow chamber exceeding the pressure in said closed chamber by a predetermined amount closes said valve set.

The above and further features and advantages of the present invention will become clear from the following description of a preferred embodiment thereof, given by way of example only, reference being had to the accompanying drawings, wherein:

FIG. 1 shows schematically the hydraulic brake circuit of an agricultural tractor; and FIG. 2 shows on a larger scale and partially in cross-section the control valve of the system of FIG. 1.

Referring firstly to FIG. 1, first and second rear ground-engaging members 1,2 and first and second front ground-engaging members 3,4 of an agricultural tractor are shown. The ground-engaging members may, for example, be pneumatically tired wheels or an arrangement incorporating a continuous, recirculating track.

Each ground-engaging member has associated therewith a hydraulically operated brake mechanism of any suitable form, for example a drum brake. Respective hydraulic pipes 5,6,7,8 are connected to the brake mechanisms.

Pipes 5 and 6 are connected respectively to the outputs of first and second hydraulic master cylinders 9,10 which may, for example, be as described in British patent specification No. 1,211,047. Each master cylinder 9,10 has associated therewith a respective brake pedal 11,12 so that by operating one or other brake pedal 11,12 the driver of the vehicle can brake one or other of the rear ground-engaging members 1,2 in order to steer the vehicle. A mechanical link 13 is provided which can be used to lock the brake pedals 11,12 together whereby the master cylinders 9,10 will be operated together when rear wheel steering is not required. A hydraulic connection 14 interconnects the master cylinders 9,10 and is effective when both master cylinders are operated to equalize pressure between the master cylinder outputs. However, when one only of the master cylinders is operated no pressure equalization is provided through the hydraulic connection 14. For further details of the master cylinders reference should be had to the above mentioned British patent specification.

In addition to being connected to the pipe 5 the output of the first master cylinder 9 is connected via a pipe 15 to a first input A of a control valve 16. Similarly, the output of the second master cylinder 10 is connected by a pipe 17 to a second input B of the control valve 16. The output C of the control valve 16 is connected by a pipe 18 to the pipes 7,8 supplying the front brake mechanisms.

It will be appreciated that when either of the master cylinders 9,10 is operated independently of the other, the output pressure of the master cylinder which is operated will be applied to the input A or B as the case may be. Further, when both master cylinders are operated together a substantially equal pressure will be applied to both inputs A and B by virtue of the hydraulic connection 14.

Referring now to FIG. 2 the control valve 16 is illustrated on a larger scale. The control valve 16 comprises a unitary body 19 in which is formed a stepped blind bore 20. The largest end of the bore is closed by an end plug 21 provided with a seal 22. A control piston 23 is slidably mounted within the bore and sealingly engages the wall of the bore by means of a seal 24. The control piston 23 divides the bore into a closed chamber 25 in fluid communication with the input B and a flow chamber 26 which interconnects the input A and the output C. The flow chamber 26 is divided into a first portion 26A which is bounded in part by the piston 23 and is in communication with the input A and a second portion 26B which is in communication with the output C by a valve set comprising a member 27 and a valve head 29. The valve member 27 is preferably as shown in British Pat. No. 1159876 and is located by a retainer 28. The valve member 27 is cooperable with valve head 29 to interrupt communication between the first portion 26A and the second portion 26B of the flow chamber. The valve head 29 is rigidly coupled to the control piston by a piston rod 30 and is a clearance fit within the bore 20. The end of the valve head 29 is formed with a slot 31 and is normally held in engagement with a shoulder 32 formed in the bore 20 by a spring 33. The valve member 27 and valve head 29 accordingly form a valve which is normally held in the open position by spring 33 to permit free communication between the input A and the output C via the flow chamber 26.

In use, if the second master cylinder 10 only is operated hydraulic pressure is applied to the input B and pressurizes the closed chamber 25. This firmly maintains the valve head 29 in engagement with the shoulder 32 and thus maintains the fluid communication between the input A and the output C. However, since only the second master cylinder 10 is being operated there is no fluid pressure at the output of the first master cylinder, and accordingly no fluid pressure is applied to the front brakes.

If only the master cylinder 9 is operated hydraulic pressure is applied to the input A and is transmitted via the flow chamber 26 to the output C and thus to the front brakes. Because of frictional resistance, return springs, etc. associated with the front brake mechanisms a small back pressure will be produced in the flow chamber 26 before the front brakes are actually applied. This small back pressure operates over the entire cross sectional area of the control piston 23 and is only opposed by the spring 33, there being no hydraulic pressure in the closed chamber 25 because the second master cylinder is not being operated. Accordingly, because the spring 33 is a fairly light spring the control piston 23 rapidly moves to the right as viewed in FIG. 2 whereupon the valve head 29 engages the valve member 27 to isolate the input A from the output C. A further increase in pressure at the input A serves to increase the force tending to move the control piston 23 to the right and accordingly maintains the isolation between the input A and the output C.

If both master cylinders were operated together as a result of the link 13 being in position a substantially equal pressure is applied to the inputs A and B and accordingly substantially equal pressure forces are generated on each side of the piston 23. Accordingly the piston 23 is pressure balanced and the spring 33 maintains the control valve in an open state in order to allow hydraulic fluid from the first master cylinder 9 to flow via the pipe 15, inlet A, outlet C, and pipe 18 to the pipes 7,8 connected to the front brake mechanisms. Under these circumstances hydraulic fluid will be supplied directly from the first master cylinder 9, and indirectly from the second master cylinder 10 by means of the hydraulic connection 14, to the outlet C of valve 16.

It will be appreciated that in the above described arrangement only a single dynamic seal 24 is used. Those skilled in the art will appreciate the significant advantages obtained from this arrangement as compared with prior art arrangements using more dynamic seals.

I claim:

1. A hydraulic brake system for a vehicle which includes a pair of front ground-engaging members and a pair of rear ground-engaging members and which is steerable by selectively braking one of the rear ground-engaging members, the system comprising: a separate hydraulic rear brake mechanism for each rear ground-engaging member; first and second hydraulic master cylinders each connected to a respective one of said hydraulic brake mechanisms, each master cylinder being separately operable to brake its associated rear ground-engaging member; a separate hydraulic front brake mechanism for each front ground-engaging member; and a control valve connected to both hydraulic master cylinder outputs and to both front brake mechanisms, the control valve including: a closed chamber connected to the output of the second master cylinder; a flow chamber connected to the output of the first master cylinder and to the front brake mechanisms; a control piston separating said chambers; a normally open valve set located in said flow chamber and closable to isolate the output of the first master cylinder from the front brake mechanisms; and means coupling said valve set to said control piston whereby movement of said control piston in response to the pressure in said flow chamber exceeding the pressure in said closed chamber by a predetermined amount closes said valve set.

2. A hydraulic brake system according to claim 1 wherein the control piston is biased by a spring located in the closed chamber into a position maintaining the valve set open.

3. A hydraulic brake system according to claim 1 or claim 2 wherein the valve set comprises a valve member which is substantially fixed relative to the valve body, and a valve head which is rigidly connected to the control piston and is located, when the valve set is open, on the side of the valve member remote from the control piston.

4. A hydraulic brake system according to claim 1 wherein the valve body is a unitary structure having a progressively stepped bore in which the control piston and valve set are mounted.

5. A hydraulic brake system according to claim 4 wherein the bore is sealingly closed by an end plug, the closed chamber being defined between the end plug and the control piston.

* * * * *